(12) United States Patent
Dinan

(10) Patent No.: US 8,332,711 B2
(45) Date of Patent: Dec. 11, 2012

(54) SYSTEMS AND METHODS OF INFORMATION TRANSMISSION

(75) Inventor: Esmail Dinan, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 758 days.

(21) Appl. No.: 12/479,913

(22) Filed: Jun. 8, 2009

(65) Prior Publication Data

US 2010/0313095 A1    Dec. 9, 2010

(51) Int. Cl.
  *H04L 1/18*    (2006.01)
(52) U.S. Cl. ............... 714/749; 714/750; 714/758
(58) Field of Classification Search .............. 714/749, 714/748, 750, 758; 370/322
  See application file for complete search history.

(56) References Cited

U.S. PATENT DOCUMENTS

| | | | | |
|---|---|---|---|---|
| 6,161,207 A | * | 12/2000 | Lockhart et al. | 714/758 |
| 7,864,735 B2 | * | 1/2011 | Ma et al. | 370/331 |
| 7,881,326 B2 | * | 2/2011 | Siminoff | 370/431 |
| 8,077,634 B2 | * | 12/2011 | Maggenti et al. | 370/260 |

* cited by examiner

*Primary Examiner* — Fritz Alphonse
(74) *Attorney, Agent, or Firm* — Crowell & Moring LLP

(57) ABSTRACT

Systems and methods of information transmission are provided. An endpoint receiving packets with non-voice information transmits negative and positive acknowledgements over a dedicated channel in an uplink subframe. When the endpoint receives packets with voice information, the endpoint transmits negative acknowledgements over a shared channel, but does not transmit positive acknowledgements.

18 Claims, 6 Drawing Sheets

SYSTEMS AND METHODS OF INFORMATION TRANSMISSION

BACKGROUND OF THE INVENTION

Communication systems rely upon a wireless or wired transmission medium for exchanging communications between endpoints. Information transmitted across the transmission medium may be subject to impairments, and accordingly may not be correctly received or may not be received at all. Various techniques are employed to ensure that transmitted information is correctly received, including error correction encoding, power control, packet retransmission, and the like.

One technique that employs a combination of error correction encoding and packet retransmission is known as hybrid automatic retransmission request (HARQ). HARQ involves a combination of forward error correction encoding (FEC) and automatic retransmission requests (ARQ) such that an endpoint sends either an acknowledgement (ACK) or negative acknowledgment (NACK) for each received packet. When a NACK is transmitted, the original packet is FEC encoded and retransmitted to the endpoint. The endpoint attempts to recover the original packet information by using a combination of the original packet and the retransmitted packet.

SUMMARY OF THE INVENTION

HARQ is typically implemented to improve radio link reliability and cell-edge coverage. However, due to the need for very low latency, voice communications typically do not employ retransmission techniques. Instead, voice communications typically employ error protection techniques such as power control and/or modulation and coding schemes (MCS).

It has been recognized that some communication protocols (e.g., WiMAX) could implement HARQ and provide the low latency necessary for voice communications. HARQ, however, consumes a large amount of bandwidth when used in connection with the transmission of voice information. For example, in a WiMAX network a dedicated HARQ feedback channel is provided in the uplink subframe for each communication channel. Because the ACK/NACK packets are typically 6-8 bytes and voice packets are typically 20-30 bytes, implementing HARQ for voice communications introduces more than a 20% overhead to support that necessary feedback signaling. This additional overhead reduces the amount of network capacity available for the actual user data, and accordingly limits the number of simultaneous voice communication sessions that can be supported by an access point.

Exemplary embodiments of the present invention involve systems and methods for transmission of information for a call between a first and second endpoint. Specifically, exemplary embodiments of the present invention employ a shared channel to provide retransmission request feedback information to an access point for packets including voice information in the payload portion of the packet. An endpoint receiving the packet with voice information in the payload portion attempts to decode the packet. If the packet is not decodable, then the endpoint transmits a negative acknowledgement over a shared channel. If the packet is decodable then the endpoint does not transmit an acknowledgement to the access point. Accordingly, the access point will retransmit the packet when a negative acknowledgement is received over the shared channel and will transmit a next packet with voice information in the payload portion when a negative acknowledgement is not received.

In accordance with one aspect of the present invention, an access point transmits a first packet that includes voice information in a payload portion of the packet to a second endpoint. The access point determines that the first packet was not decodable when a negative acknowledgement is received over a shared channel. The access point transmits a second packet when a negative acknowledgement is received, wherein the second packet is a retransmission of the first packet.

In accordance with another aspect of the present invention a second endpoint receives a first packet that includes voice information in a payload portion of the first packet. The second endpoint determines whether the first packet is decodable and transmits a negative acknowledgement over a shared channel when it is determined that the first packet was not decodable.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
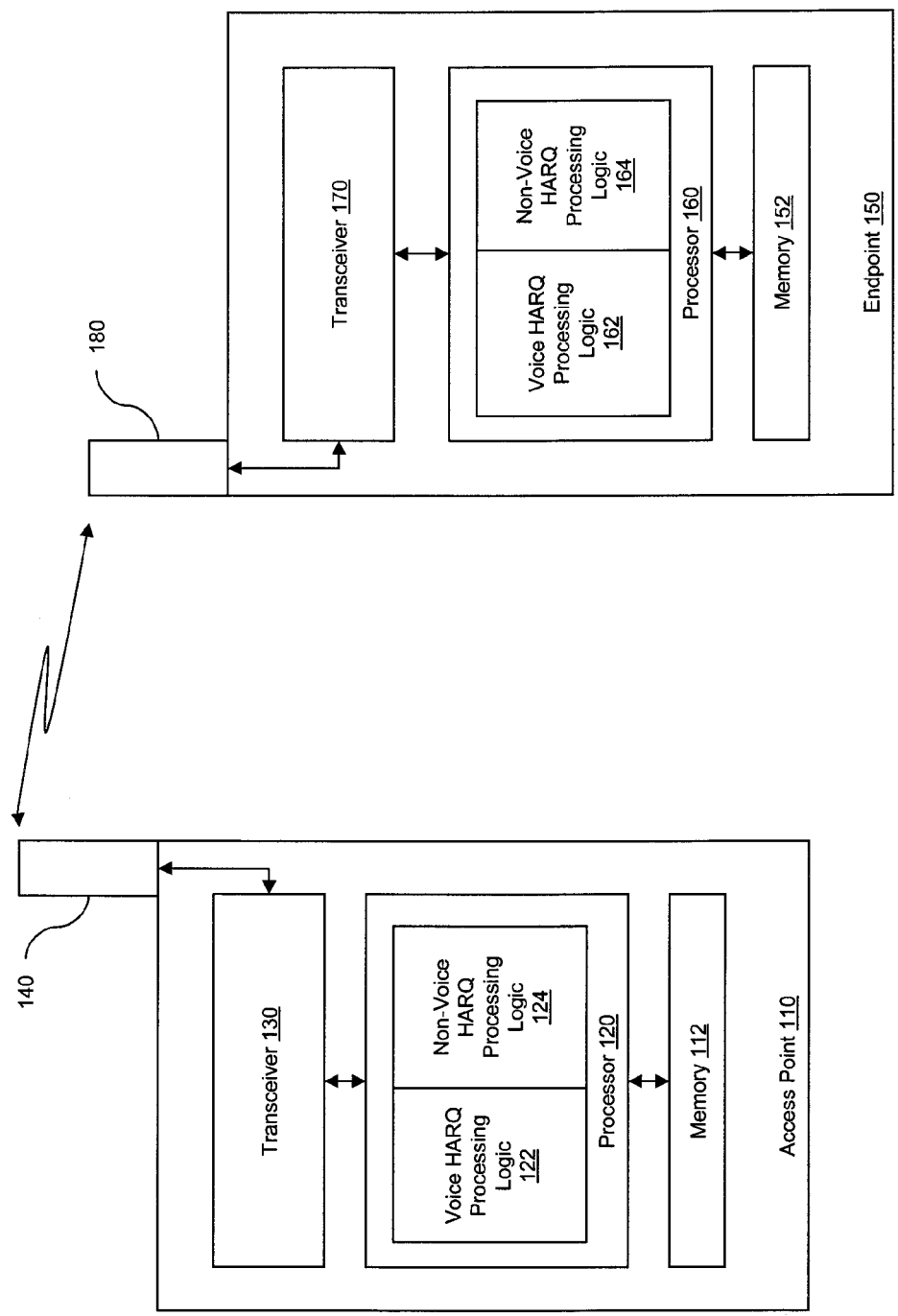
FIG. 1 is a block diagram of an exemplary access point and endpoint in accordance with the present invention.

FIG. 1 is a block diagram of an exemplary access point and endpoint in accordance with the present invention. Access point 110 communicates with endpoint 150 using wireless signals over an air interface. Access point 110 includes memory 112, processor 120, one or more transceivers 130 and one or more antennas 140. Access point 110 can be any type of access point, including, but not limited to, a base station. Endpoint 150 includes memory 152, processor 160, one or more transceivers 170 and one or more antennas 180. Endpoint 150 can be any type of endpoint, including, but not limited to, a wireless telephone, a personal digital assistant (PDA), a laptop computer, a desktop computer and/or the like. As will be described in more detail below, exemplary embodiments of the present invention employ different types of HARQ processing for voice information and non-voice information. Accordingly, processors 120 and 160 include different types of logic for processing the different types of information.

Processors 120 and 160 can be any type of processor, including a field programmable gate array (FPGA), application specific integrated circuit (ASIC) and/or microprocessor. When either of the processors is a microprocessor, the associated logic can be processor executable code loaded from the associated memory. Memories 112 and 152 can be any type of memory, including random access memory (RAM), read only memory (ROM), flash memory, one or more hard disks, and/or the like.

It should be recognized that FIG. 1 is a simplified block diagram and that access point 110 and endpoint 150 can include additional components beyond those illustrated. For example, endpoint 150 can include one or more display devices, one or more input devices, microphones, speakers and/or the like. Additionally, although FIG. 1 illustrates only a single endpoint communicating with the access point, the access point can support more than one endpoint. Moreover, the system can include more than one access point.

Figure 2A:
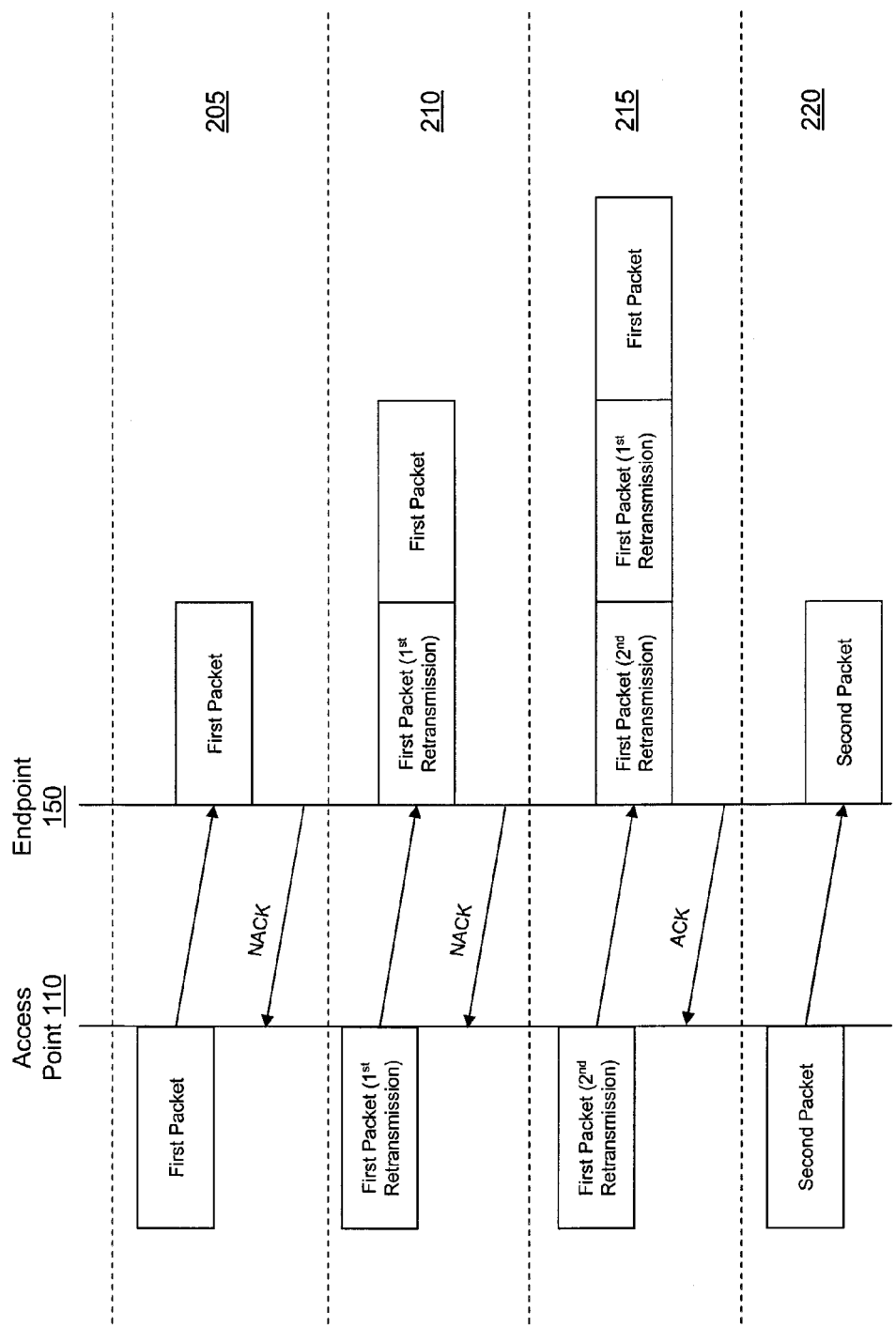
FIG. 2A is a call flow diagram for transmission of packets including non-voice information in a payload portion of the packet in accordance with exemplary embodiments of the present invention.

FIG. 2A is a call flow diagram for transmission of packets including non-voice information in accordance with the present invention. Specifically, each packet includes overhead information in a header portion of the packet and non-voice information in the payload portion of the packet. Access point 110 employs logic 124 to support this call flow and endpoint 150 employs logic 164 to support this call flow. The transmission of packets with non-voice information in the payload portion involves sending a NACK or ACK over a dedicated channel for each transmitted or retransmitted packet. Accordingly, logic 124 determines whether ACK or NACK feedback messages are received and controls the transceiver to retransmit the same packet or to transmit a next packet. Logic 164 determines whether the packets received by the endpoint are decodable and controls the associated transceiver to transmit ACK and NACK feedback messages.

The call flow of FIG. 2A assumes that the first packet is not correctly received (i.e., is not decodable) and that endpoint 150 transmits a NACK to access point 110 over a dedicated channel (step 205). Accordingly, access point 110 retransmits the first packet, endpoint 150 attempts to decode the information by using a combination of the first packet and the first retransmission of the packet, and sends a NACK to access point 110 over a dedicated channel indicating that the endpoint 150 still cannot decode the information in the packet (step 210). Access point 110 then sends a second retransmission of the first packet, endpoint 150 attempts to decode the information using the first packet and the first and second retransmissions of the packet, and sends an ACK over a dedicated channel to access point 110 indicating that the packet information was correctly decoded (step 215). Access point 110 then sends the next, second packet to endpoint 150 (step 220). If the information in the packet cannot be correctly decoded, a similar process to that described above will be performed. The retransmitted packets are not necessarily identical to the originally transmitted packet. For example, the retransmitted packets can be forward error correction (FEC) encoded, while the originally transmitted packet is not.

Figure 2B:
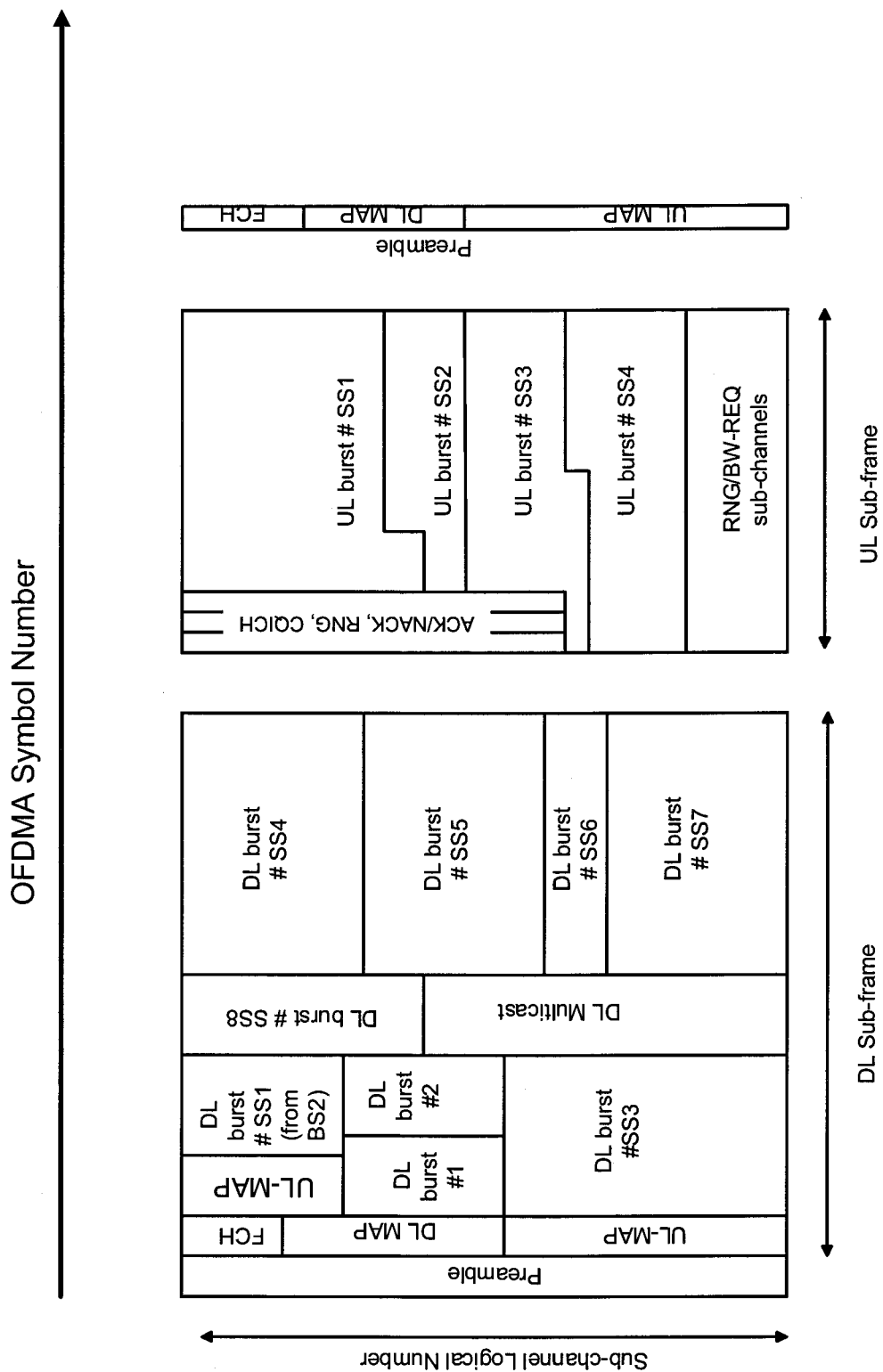
FIG. 2B is a block diagram of an exemplary frame in accordance with the present invention.

FIG. 2B is a block diagram of an exemplary frame in accordance with the present invention. The exemplary frame is a WiMAX frame in which access point 110 uses the downlink (DL) subframe to transmit control and other information to endpoints, and the endpoints use the uplink (UL) subframe for transmitting control and other information to the access point. Those skilled in the art will recognize that WiMAX frames are transmitted using orthogonal frequency division multiplexing (OFDM). As illustrated in FIG. 2B, the uplink subframe includes a portion for transmitting ACK and NACK messages as part of a HARQ procedure. Conventional HARQ techniques employed a dedicated channel in the uplink subframe assigned to each endpoint for transmitting ACK and NACK messages to the access point and the endpoint must transmit an ACK or a NACK to the access point in response to receipt of each packet in the assigned dedicated channel. As will be described in more detail below, exemplary embodiments of the present invention employ shared channels for endpoints to transmit HARQ feedback information for packets that include voice information in the payload portion of the packet and only transmit NACKs for these packets. Packets with voice information in the payload portion that are successfully decoded do not result in the transmission of an ACK message.

Figure 3:
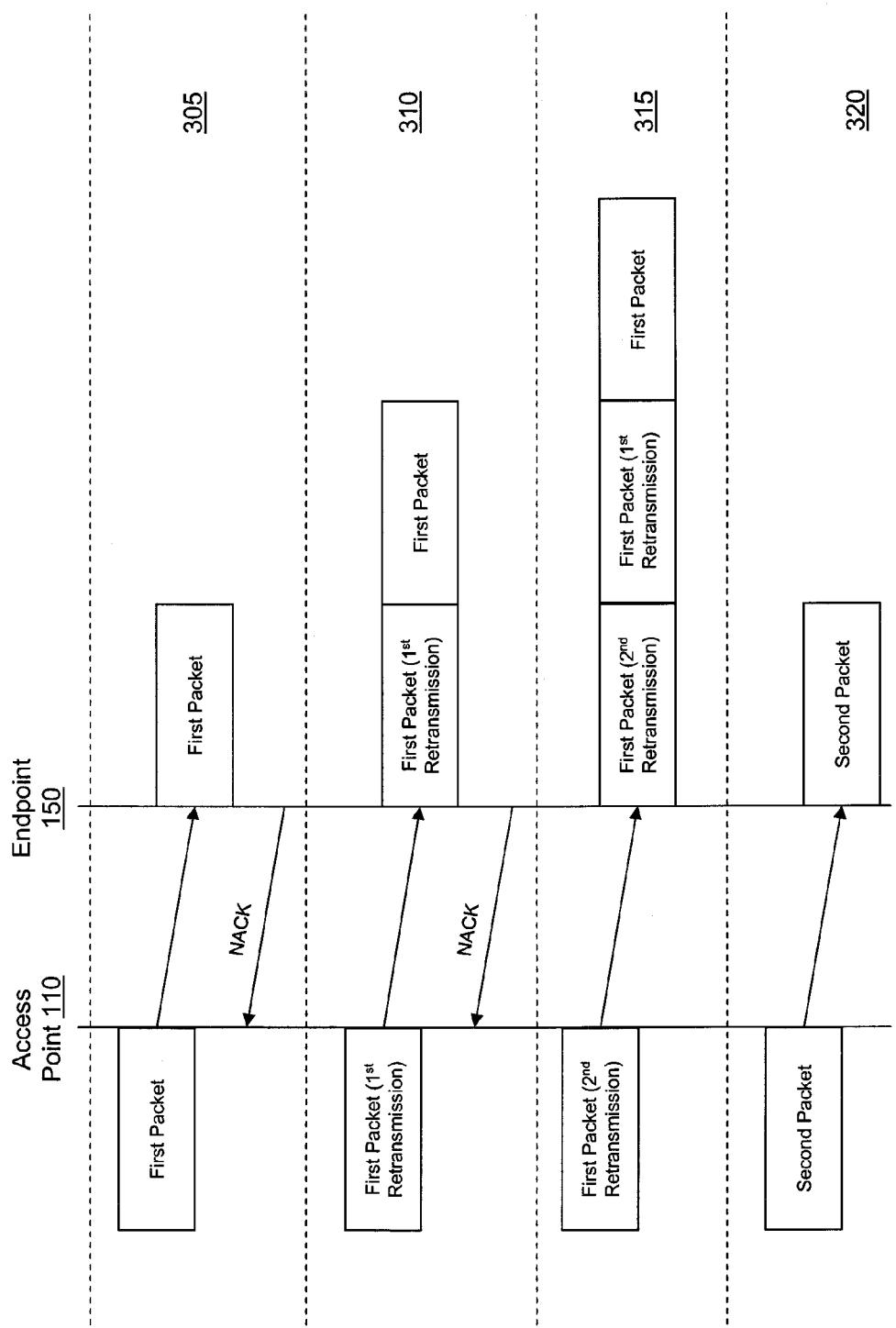
FIG. 3 is a call flow diagram for transmission of packets including voice information in a payload portion of the packet in accordance with exemplary embodiments of the present invention.

FIG. 3 is a call flow diagram for transmission of packets including voice information in accordance with the present invention. Specifically, each packet includes overhead information in a header portion of the packet and voice information in the payload portion of the packet. The voice information can be formatted in accordance with, for example, Voice over IP (VoIP). Access point 110 employs logic 122 to support this call flow and endpoint 150 employs logic 162 to support this call flow. Accordingly, logic 122 determines whether NACK feedback messages are received and controls the transceiver to retransmit the same packet or to transmit a next packet. Logic 164 determines whether the packets received by the endpoint are decodable and controls the associated transceiver to transmit NACK feedback messages over a shared channel.

Access point 110 transmits the first packet to endpoint 150, and endpoint 150 indicates that the packet could not be successfully decoded by transmitting a NACK over a shared channel in an uplink subframe of the same frame in which the packet was received (step 305). Access point 110 then retransmits the first packet to endpoint 150 which attempts to decode the information using both the first packet and the retransmission of the first packet, and when this cannot be successfully decoded, endpoint 150 transmits a NACK message back to access point 110 over a shared channel in an uplink subframe of the same frame in which the packet was received (step 310). Access point 110 then retransmits the first packet for a second time, and endpoint 150 attempts to decode the information using both the first packet and the first and second retransmissions of the first packet (step 315). Because the endpoint 150 can successfully decode the information, the endpoint does not transmit an ACK message. Accordingly, access point 110, by not receiving a NACK message in the corresponding uplink subframe in which the second retransmission of the packet was transmitted, transmits the second packet to endpoint 150 (step 320). Endpoint 150 then attempts to decode the second packet and if it cannot, will repeat similar steps to those discussed above. The retransmitted packets are not necessarily identical to the originally transmitted packet. For example, the retransmitted packets can be forward error correction (FEC) encoded, while the originally transmitted packet is not.

As discussed above, exemplary embodiments of the present invention employ a shared channel for transmitting NACK messages for packets carrying voice information in the payload portion. The shared channel can be randomly selected from a group of shared channels that are used by other endpoints. Because the NACK messages are transmitted over randomly selected shared channels, NACK messages from two or more endpoints may collide when transmitted over the same shared channel at the same time. The collision ratio can be reduced to an acceptable level by selecting the correct number of shared NACK feedback channels based on the currently supported voice connections. The number of required shared feedback channels can be configured based on the number of active voice connections and voice packet error rate (PER) in the air interface. The optimum number of shared feedback channels is configured to balance HARQ feedback overhead and contention probability. Increasing the number of shared feedback channels reduces the probability of contention for transmitting NACK packets (improves customer experience), but increases the signaling overhead.

Assume, for example, that 200 voice calls are established, and each voice call transmits one packet every 20 msec. Also assume radio frame duration is 5 msec. Therefore, 200*5/20=50 voice packets are transmitted in each frame. Assuming that the PER is on average 10%, then on average only five endpoint would transmit a NACK message in each frame using shared feedback channels. In such a scenario, 7 to 10 shared feedback channels would be sufficient for HARQ packet transmission.

Figure 4:
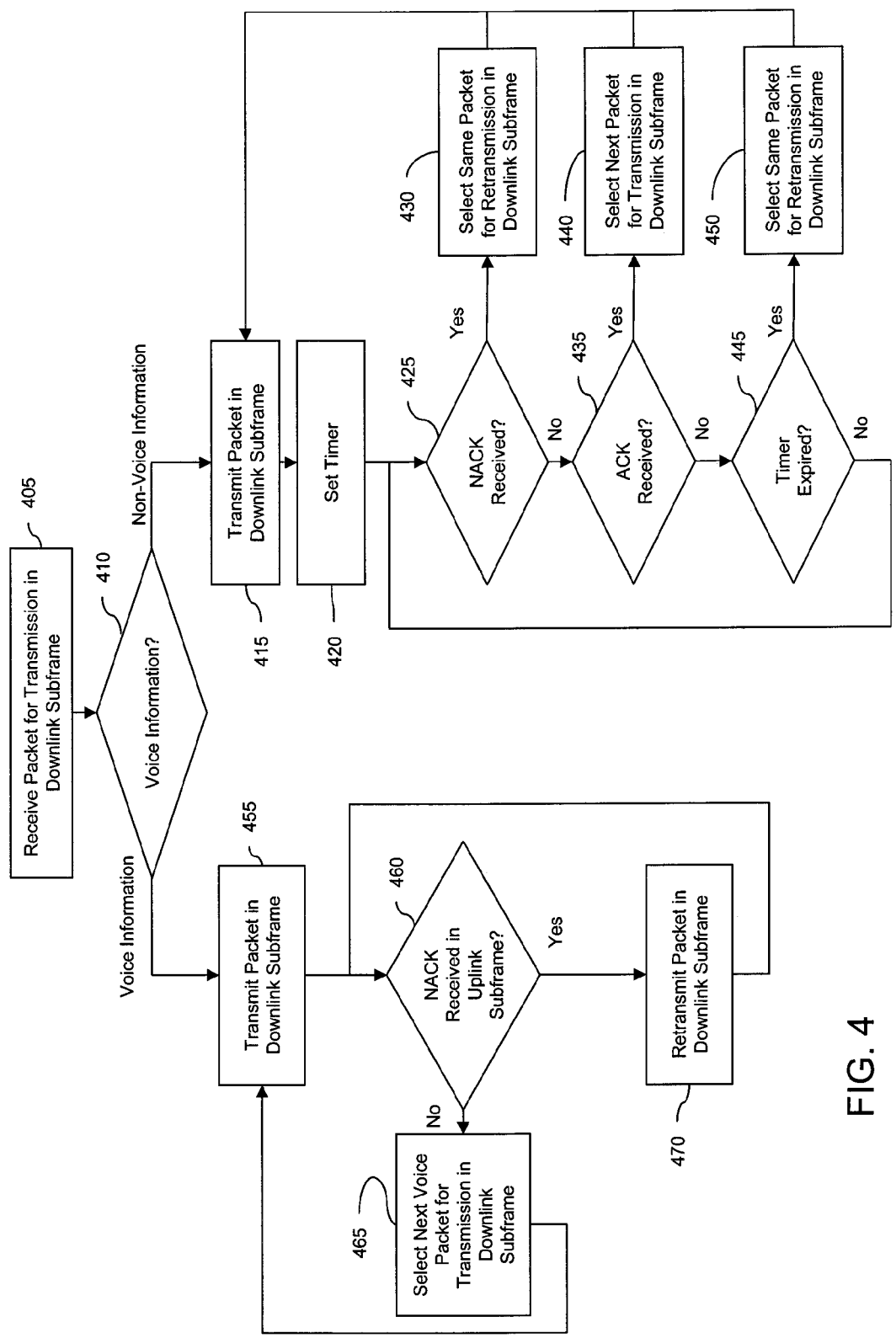
FIG. 4 is a flow diagram of an exemplary method for an access point in accordance with the present invention.

FIG. 4 is a flow diagram of an exemplary method for an access point in accordance with the present invention. Initially, access point 110 receives a packet for transmission in a downlink subframe (step 405), and determines whether a payload portion of the packet includes voice information (step 410).

When the payload portion of the packet does not contain voice information ("Non-Voice Information" path out of decision step 410), then the access point transmits the packet in the downlink subframe (step 415) and sets a timer (step 420). The timer is used by the access point in case uplink channel impairments prevent an ACK or NACK message from being received by the access point. Accordingly, while the timer is running the access point determines whether a NACK message has been received (step 425), an ACK message has been received (step 435), or whether the timer has expired (step 445). When a NACK message has been received ("Yes" path out of decision step 425), access point 110 selects the same packet for retransmission in the downlink subframe (step 430) and transmits the packet in the downlink subframe (step 415). When an ACK message has been received ("Yes" path out of decision step 435), the access point selects the next packet for transmission in the downlink subframe (step 440) and transmits the packet in the downlink subframe (step 415). When an ACK or NACK message has not been received ("No" paths out of decision steps 425 and 435) and the timer has expired ("Yes" path out of decision step 445), the access point selects the same packet for retransmission in the downlink subframe (step 450) and transmits the packet in the downlink subframe (step 415). In this latter case, the failure to receive an ACK or NACK message is considered as the endpoint not being able to correctly decode the transmitted packet.

Returning again to step 410, when the received packet includes voice information in the payload portion ("Voice Information" path out of decision step 410), access point 110 transmits the packet in the downlink subframe (step 455) and determines whether a NACK message has been received in the uplink subframe of the same frame in which the packet was transmitted to the endpoint (step 460). When the access point does not receive a NACK message in the uplink subframe of the same frame in which the packet was transmitted to the endpoint ("No" path out of decision step 460), the access point assumes that the packet was correctly decoded and selects the next packet with voice information in the payload for transmission in the downlink subframe (step 465) and transmits the packet in the downlink subframe (step 455). When a NACK message has been received in the uplink subframe ("Yes" path out of decision step 460), access point 110 retransmits the packet in the downlink subframe (step 470) and waits to determine whether the uplink subframe includes a corresponding NACK message (step 460).

Figure 5:
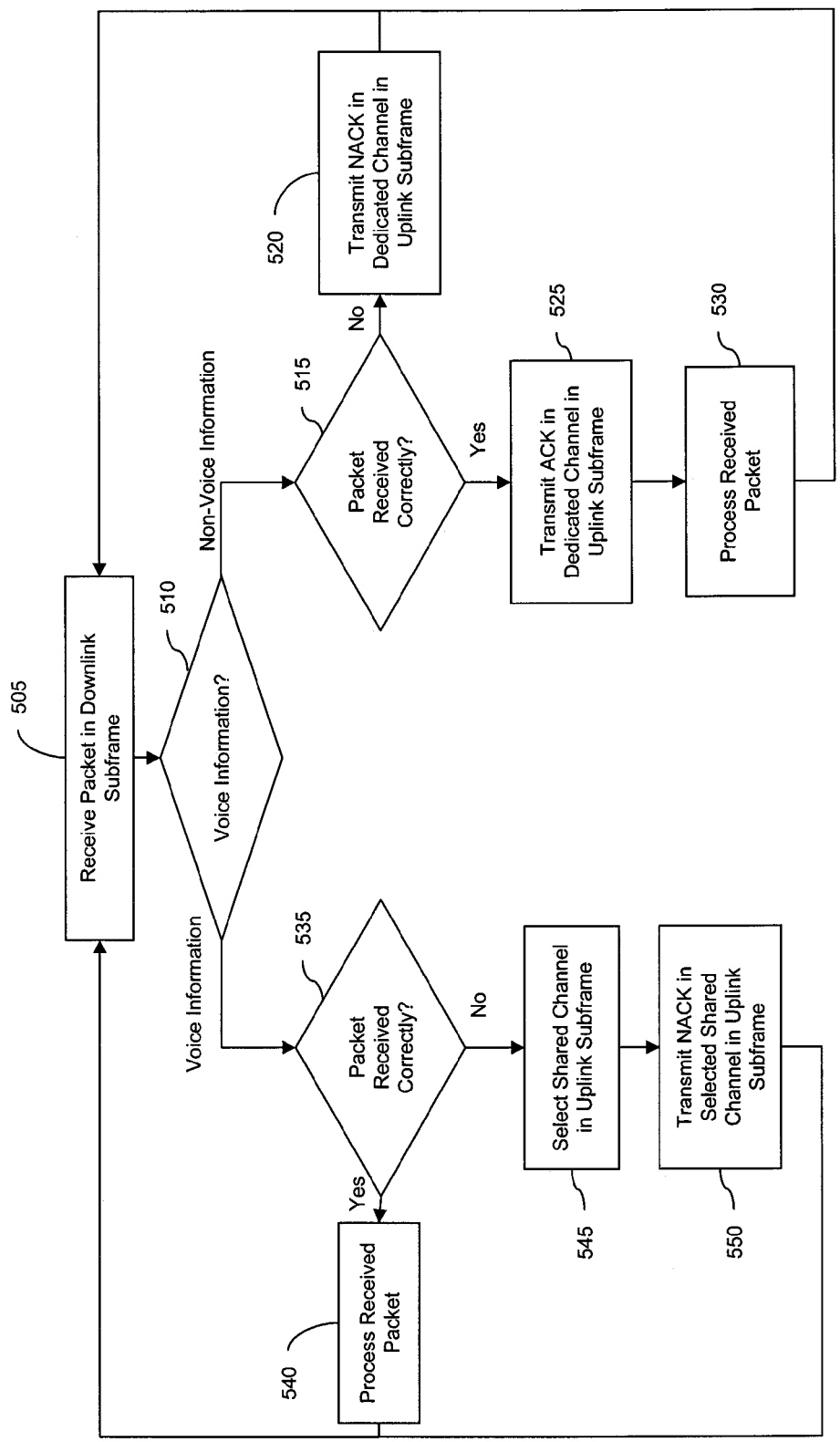
FIG. 5 is a flow diagram of an exemplary method for an endpoint in accordance with the present invention.

FIG. 5 is a flow diagram of an exemplary method for an endpoint in accordance with the present invention. When the endpoint receives a packet in the downlink subframe (step 505), the endpoint determines whether the packet includes voice information in the payload portion (step 510). When the packet does not include voice information in the payload portion ("Non-Voice Information" path out of decision step 510), the endpoint determines whether the packet has been received correctly and can be decoded (step 515). When the packet cannot be correctly decoded ("No" path out of decision step 515), the endpoint transmits a NACK message in a dedicated channel in the uplink subframe (step 520). If, however, a packet was received correctly ("Yes" path out of decision step 515), the endpoint transmits an ACK message in the dedicated channel in the uplink subframe (step 525) and processes and decodes the received packet (step 530). When the packet is a retransmitted packet the decoding can employ both the original packet and the retransmitted packet.

Returning again to step 510, when the received packet includes voice information in the payload portion ("Voice Information" path out of decision step 510), the endpoint determines whether the packet was received and correctly decoded (step 535). When the packet can be correctly decoded ("Yes" path out of decision step 535), the endpoint processes the received packet (step 540) and waits to receive the next packet in the downlink subframe. When the packet is a retransmitted packet the decoding can employ both the original packet and the retransmitted packet. If, however, the packet was not correctly decoded ("No" path out of decision step 535), the endpoint selects a shared channel in the uplink subframe in the same frame in which the packet was received (step 545) and transmits a NACK message in the selected shared channel in the uplink subframe (step 550).

By implementing the HARQ techniques of the present invention an initial packet error rate (PER) can be reduced from 10% to between 1 and 2%. Furthermore, the exemplary HARQ techniques of the present invention introduce 5-10 times less overhead to support packet retransmissions compared to conventional HARQ techniques, while still providing similar performance to these conventional techniques. For example, assuming a downlink PER of 10% and 50 concurrent voice calls, the present invention would require, for example, only 7 HARQ feedback channels to support the voice calls, whereas conventional techniques that employ dedicated channels would require 50 HARQ feedback channels.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of information transmission for a call between a first and second endpoint, comprising:
    transmitting, by an access point to the second endpoint, a first packet that includes voice information in a payload portion of the packet;
    determining, by a processor of the access point, that the first packet was not decodable when a negative acknowledgement is received over a shared channel;
    transmitting, by the access point, a second packet when a negative acknowledgement is received, wherein the second packet is a retransmission of the first packet; and
    transmitting, by the access point, a third packet when an acknowledgement is not received, wherein the third packet includes different voice information in a payload portion of the third packet than the first packet.

2. The method of claim 1, wherein the first packet is transmitted in a downlink subframe of a first frame, and the third packet is transmitted in a downlink subframe of a second frame when a negative acknowledgement is not received in an uplink subframe of the first frame.

3. The method of claim 2, wherein the negative acknowledgement is received in the uplink subframe of the first frame.

4. The method of claim 1, further comprising:
   transmitting, by the access point, a fourth packet, wherein the fourth packet includes non-voice information in a payload portion of the fourth packet;
   determining, by the access point, that the fourth packet is not decodable when a negative acknowledgement is received over a dedicated channel; and
   determining, by the access point, that the packet was decodable when a positive acknowledgment is received over the dedicated channel.

5. The method of claim 4, wherein the fourth packet is transmitted over a downlink subframe of a second frame and the negative acknowledgment or positive acknowledgement is received in an uplink subframe of the second frame.

6. The method of claim 4, wherein the fourth packet is transmitted over a downlink subframe of a second frame and the negative acknowledgment or positive acknowledgement is received in an uplink subframe of a frame subsequent to the second frame.

7. The method of claim 1, wherein the first and second packets are transmitted using orthogonal frequency division multiplexing (OFDM).

8. A method of information transmission for a call between a first and second endpoint, comprising:
   receiving, by the second endpoint as part of the call, a first packet that includes voice information in a payload portion of the first packet;
   determining, by a processor of the second endpoint, whether the first packet is decodable;
   transmitting a negative acknowledgement over a shared channel when it is determined that the first packet is not decodable;
   receiving, by the second endpoint, a second packet, wherein the second packet is a retransmission of the first packet;
   decoding the voice information using the first and second packets;
   receiving, by the second endpoint, a third packet that includes non-voice information in a payload portion of the third packet;
   determining whether the third packet is decodable; and
   transmitting, by the second endpoint, an acknowledgment over a dedicated channel based on the determination of whether the third packet is decodable, wherein the acknowledgement is a positive acknowledgement when the third packet is decodable and the acknowledgement is a negative acknowledgement when the third packet is not decodable.

9. The method of claim 8, wherein the first packet is received in a downlink subframe of a first frame and the negative acknowledgement is transmitted in an uplink subframe of the first frame.

10. An access point, comprising:
    a transceiver; and
    a processor, coupled to the transceiver, the processor comprising voice retransmission request logic that
       controls the transceiver to transmit a first packet that includes voice information in a payload portion of the packet to a second endpoint;
       determines that the first packet was not decodable when a negative acknowledgement is received over a shared channel via the transceiver; and
       controls the transceiver to transmit a second packet when a negative acknowledgement is received, wherein the second packet is a retransmission of the first packet, wherein the voice retransmission logic controls the transceiver to transmit a third packet when an acknowledgement is not received, wherein the third packet includes different voice information in a payload portion of the third packet than the first packet.

11. The access point of claim 10, wherein the first packet is transmitted in a downlink subframe of a first frame, and the third packet is transmitted in a downlink subframe of a second frame when a negative acknowledgement is not received in an uplink subframe of the first frame.

12. The access point of claim 11, wherein the negative acknowledgement is received in the uplink subframe of the first frame.

13. The access point of claim 10, wherein the processor further comprises:
    non-voice transmitting retransmission logic that
       controls the transceiver to transmit a fourth packet, wherein the fourth packet includes non-voice information in a payload portion of the fourth packet;
       determines that the fourth packet is not decodable when a negative acknowledgement is received over a dedicated channel; and
       determines that the packet was decodable when a positive acknowledgment is received over the dedicated channel.

14. The access point of claim 13, wherein the fourth packet is transmitted over a downlink subframe of a second frame and the negative acknowledgment or positive acknowledgement is received in an uplink subframe of the second frame.

15. The access point of claim 13, wherein the fourth packet is transmitted over a downlink subframe of a second frame and the negative acknowledgment or positive acknowledgement is received in an uplink subframe of a frame subsequent to the second frame.

16. The access point of claim 10, wherein the first and second packets are transmitted using orthogonal frequency division multiplexing (OFDM).

17. An endpoint, comprising:
    a transceiver; and
    a processor, coupled to the transceiver, the processor comprising
       voice retransmission logic that
          determines whether a first packet is decodable, wherein the first packet is received by the transceiver and includes voice information in a payload portion of the first packet; and
          controls the transceiver to transmit a negative acknowledgement over a shared channel when it is determined that the first packet was not decodable, wherein the transceiver receives a second packet, wherein the second packet is a retransmission of the first packet, and the processor decodes the voice information using the first and second packets; and
       non-voice retransmission logic that
          determines whether a third packet is decodable, wherein the third packet includes non-voice information in a payload portion of the third packet; and
          controls the transceiver to transmit an acknowledgment over a dedicated channel based on the determination of whether the third packet is decodable, wherein the acknowledgement is a positive acknowledgement when the third packet is decodable and the acknowledgement is a negative acknowledgement when the third packet is not decodable.

18. The endpoint of claim 17, wherein the first packet is received in a downlink subframe of a first frame and the negative acknowledgement is transmitted in an uplink subframe of the first frame.

* * * * *